Sept. 8, 1964     D. D. HUNDT ET AL     3,147,874

SEAL FOR CROWN CLOSURES

Filed April 3, 1961     2 Sheets—Sheet 1

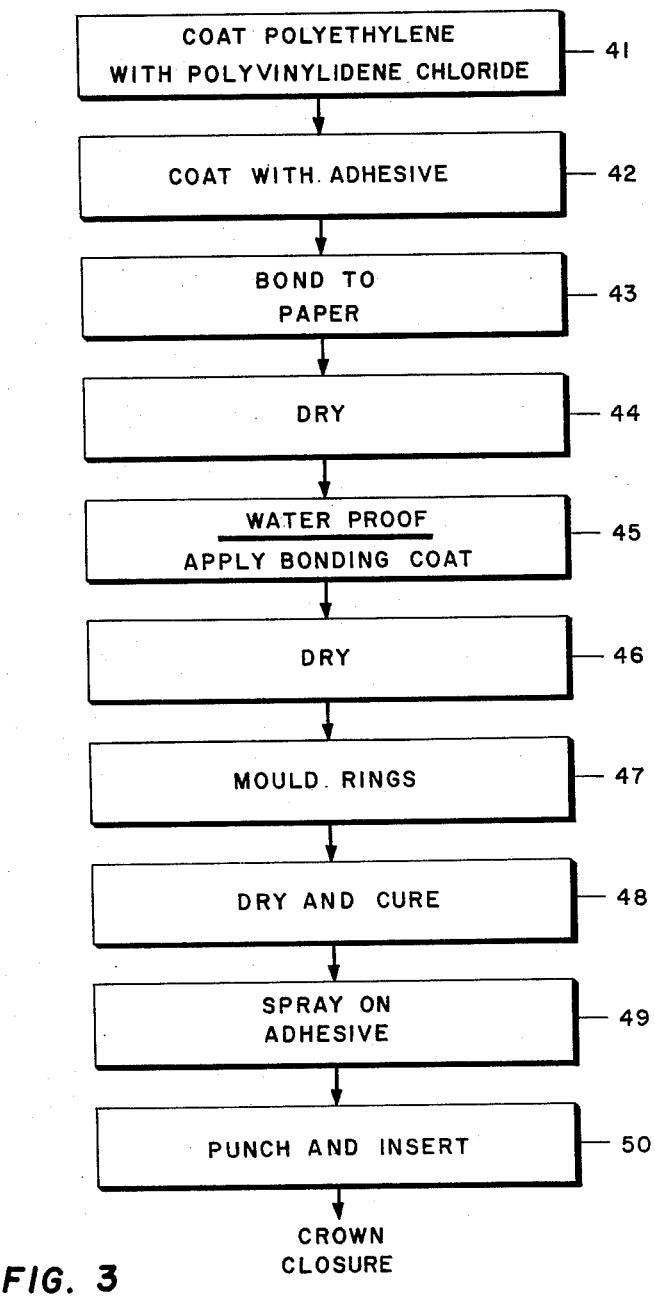

3,147,874
SEAL FOR CROWN CLOSURES
Donald D. Hundt, Arlington, and Edward W. Merrill, Belmont, Mass., assignors to W. R. Grace & Co., Cambridge, Mass., a corporation of Connecticut
Filed Apr. 3, 1961, Ser. No. 100,313
4 Claims. (Cl. 215—39)

This invention relates to seals for crown, screw, lug and similar caps or closures. It is more particularly concerned with a composite seal utilizing a molded rubber ring sealing element, to replace the cork and composition cork seals now used for caps.

A seal for crown closures needs to be impervious to prevent gas leakage, resilient to maintain a good seal for several months, mechanically strong enough to be adapted to existing bottling equipment and must present a surface to pack side that is sufficiently soft or deformable to conform to minor imperfections on the lip of the bottle or can. The seal should not impart odor or taste to the contents of the bottle and should be capable of withstanding relatively high temperatures after capping without failure.

The seal of this invention comprises a resilient molded elastomer ring carried on a gas impervious form-stable disc, with the ring in use being between the cap and disc, and generally positioned over or registering with the lip of the container. The elastomeric or rubber ring is not capable of undergoing any appreciable cold or plastic flow and imparts the necessary compressive force or spring action to the seal.

Cured rubber gaskets have been used in the past in container closures, but such gaskets objectionably flavor the contents of the container because of the curing agents, accelerators and the like use to develop the elastic properties of the rubber. In the present invention this problem is overcome by positioning the rubber ring behind the gas and liquid barrier where it cannot come in contact with the contents of the container. The arrangement is such that the resilient rubber ring exerts a sealing force against the disc, while the disc serves as a taste barrier against the rubber.

In a preferred embodiment, the gas impervious disc comprises a paper lamina to which is bonded a very thin polyvinylidene chloride polymer gas barrier lamina on the pack side and over which is placed a continuous soft polyolefin lamina more than 0.5 mil thick to protect the thin polyvinylidene chloride polymer film. The cooperation between the two polymer laminae permits the desired sealing properties to be achieved inexpensively.

This invention will become clear from the following examples and discussion of the drawings attached to and forming part of the specification.

Figure 1:
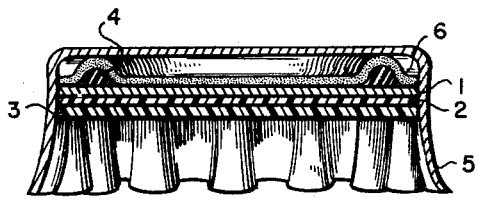
Figure 2:
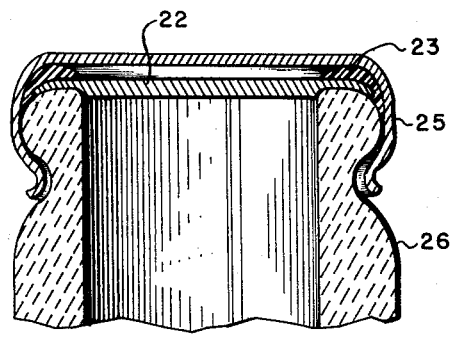

FIGURE 1 of the attached drawings illustrates one from of the seal of this invention, in cross-section, as positioned within a cap or crown closure. FIGURE 2 illustrates the seal arrangement of FIGURE 1 as attached to a beer bottle with the rubber ring being located to form a corner seal rather than a top seal. FIGURE 3 schematically illustrates a method of fabricating the seal.

Referring to FIGURE 1, a preferred embodiment of the seal of this invention comprises a tri-laminate of a plane circular paper disc 1 coated on the pack side with a thin gas impervious polyvinylidene chloride polymer film 2 and a relatively soft, but tough, polyolefin protecting film or layer 3. In service, the soft polyolefin outer surface of the tri-laminate is firmly pressed against the lip of the container by a resilient rubber ring 4, located on the cap side of the tri-laminate. The seal may be placed in a crown closure 5 using a small amount of adhesive, illustrated as lamina 6. Other adhesives, primers or pick-up coatings (not shown), may be used to form the tri-laminate and to bond the rubber ring thereto.

The gas-impervious disc member can be formed from other materials such as wax-impregnated paper, polyethylene film, aluminum, polyethylene terephthalate or cellulose acetate sheets, or similar materials that are suitably gas-impervious, non-toxic and do not impart appreciable odor or taste to the contents of the container. The materials used are preferably somewhat inflexible and form-stable to permit easy handling and insertion. While the following description will refer to a preferred embodiment of the invention based on the tri-laminate disc shown in FIGURE 1, it should be understood that equivalent discs can be used.

It will be noted that, as illustrated, the gas-impervious disc does not extend clear to the edge of the shoulder of the cap. The fit of the seal into the cap is important when relatively inflexible discs are used. For most standard size crown closures, where the seal has an outside diameter of 0.95 to 1.00 inch, the clearance or gap between the cap shoulder and the disc is about 25 to 50 mils to prevent edge wrinkling of the spot seal. Also, the disc is plane, i.e., the edges are not curled or crimped in any manner. A mil equals 0.001 inch.

FIGURE 2 shows a metal crown closure 25 containing the seal of this invention crimped to a beer bottle 26 or similar container. The crown closure contains a gas-impervious disc 22 and a bonded rubber ring 23. The rubber ring is so placed as to give what might be termed a corner seal. The ring 23 under compression tends to flow in to the corner of the cap, as illustrated. In a top seal arrangement, the rubber ring is placed more in register with the lip of the container to be sealed. In FIGURE 2, the center line of the rubber ring, in cross-section, falls somewhat beyond the center line of the lip of the bottle 26. Generally, the outer edge of the rubber ring will extend to the outer edge of the disc in the corner seal arrangement, whereas it will be within 20 to 60 mils from the edge in the top seal arrangement.

The paper lamina in the seal illustrated in FIGURE 1 is used to give mechanical strength to the spot seal. Fibrous webs, other than cellulosic, can be used, such as "papers" made from rayon fibers and made gas-impervious by impregnation with polyvinylidene chloride. If the fibrous web is not strong or tough enough, it will cause failures because of cracking of the laminate during the capping operation. When papers are used, it is preferred to use a paper having a thickness of 8 to 12 mils, a weight equivalent to in the range of 80 to 130 pounds per 3,000 square foot ream, a tensile strength proportionate to its elongation, usually greater than 40 pounds per inch width for elongations of 3 to 10 percent and greater than 15 pounds per inch width for elongations of 20 to 35 percent. This includes the so-called extensible papers. Lighter weight papers, e.g., 20 pound ream weight, can be used if they are impregnated or otherwise strengthened. The paper lamina may be made up of two or more layers of paper. A kraft paper can be used, but if appearance is important, bleached, colored or printed papers can be used.

The polyvinylidene chloride polymer is used to impart gas-imperviousness to the disc shown in FIGURE 1. Suitable polymers include polyvinylidene chloride polymers containing 75 to 92 percent vinylidene chloride monomer and 8 to 25 percent of an acrylate, acrylonitrile, vinyl chloride or other vinyl ester monomer. The polymer has preferably a density in the range of 1.4 to 1.65 grams per cubic centimeters, a tensile strength when in film form of 5 to 20 pound/inch width/mil, and a $CO_2$ permeability of less than 50 cubic centimeters—mil/square meter—24 hour—atmospheres at 40° F. as determined by D1434–58 (ASTM), preferably less than 5 for film thicknesses of about 0.1 mil or less.

A thin polyvinylidene chloride coating on the polyolefin film or on the paper, under 0.1 mil thick, will give the desired gas permeability. This is about 0.66 pound of polymer per 1000 square feet. This is advantageous because polyvinylidene chloride polymers are relatively expensive. In order to obtain the requisite continuous film on paper, however, it may be necessary to increase the amount of polymer used up to about 6.6 pound per 1000 square feet, in order to fill in the irregularities of the paper surface and obtain a smooth polymer surface. 6.6 pounds per 1000 square feet corresponds to a theoretical film thickness of about 0.9 mil.

Polyvinylidene chloride films and coatings are hard and are not suitable in themselves for forming a seal against the lip of the bottle or can, which usually have minor imperfections such as scratches or mold marks. Also, such thin films of the polymer are easily physically damaged. In commercial practice crown closures are usually stored in a loose form in a hopper and the central portion of a spot seal is subject to damage called hopper abuse during the capping operation by the edge of one cap scraping or cutting the inside of another.

A film of a relatively soft but tough thermoplastic polyolefin, preferably polyethylene, polypropylene, or mixtures thereof, over the polyvinylidene chloride film will satisfactorily protect the thin film and also form the desired soft, yielding or pressure deformable outer surface that will fill in any imperfections on the lip of the container. The polyolefin outer film also serves as an odor barrier. The thickness of the polyolefin film is over 0.5 mil, preferably 1 mil, but is generally less than 3 mils. The polyolefin used has a density of 0.920 to 0.945 gram per cubic centimeters, a melt index of 0.6 to 5, a tensile strength of 1 to 4 pounds per inch width per mil thickness, a minimum of 100 percent elongation in machine and transverse direction, and Shore D hardness of less than 65. Polyolefin films cannot be used with a paper lamina in the absence of a gas barrier because they are not sufficiently gas impervious.

It is much preferred that the polyolefin be directly bonded to the polyvinylidene chloride film without the use of adhesives. The intervening adhesive layer is usually gas permeable to some extent and may result in leakage of gas. This bonding can be accomplished by forming the polyvinylidene chloride film on the polyolefin film before bonding to the paper or by extruding the polyolefin on the polyvinylidene chloride coating or film, if the latter is first bonded to the paper.

The rubber ring used in the seal of this invention may be pre-formed and then placed on the disc. It is preferred, however, to form the rubber ring directly on a sheet of the disc material by molding, using a rotary molding system akin to intaglio printing and a gelling latex that can thereafter be cured by heat treatment. This permits the seal to be fabricated in a continuous manner and does not waste rubber, as is the case when the rings are stamped from a solid sheet. This method of molding the rubber rings in place is the subject matter of co-pending application "Rotary Intgalio Printing of Rubber Gaskets and Similar Shapes," Serial No. 100,064, by D. G. Greenlie and E. W. Merrill, filed on the same day as this application.

The pressure between the lip of the container and the sealing disc is dependent on the energy developed by the rubber ring—a function of the rubber's recovery and modulus properties. As the rigidity of the disc is increased, the modulus and recovery properties of the rubber should be increased. The rubber when cured has an ultimate tensile strength of at least 1000 p.s.i., a recovery greater than 40 percent, and a modulus at 300 percent elongation greater than 150 p.s.i. It should be able to withstand temperatures of at least 150° F. without a loss of more than 20 percent of its physical properties. The rubber preferably has an ultimate tensile strength of greater than 1500 p.s.i., a recovery greater than 50 percent, and a modulus at 300 percent elongation greater than 300 p.s.i.

Preferred rubbers for the gelling latex-printing system are natural, GR–S (styrene-butadiene copolymer, the butadiene comprising at least 40 percent thereof) and butyl (isobutylene with a small percentage of isoprene), cured using suitable curing systems known to the art. If the rubber rings are formed by other methods, any known vulcanizable elastomer having the above properties can be used.

For the common size of seals used in crown closures, the rubber ring will have a thickness of 20 to 40 mils and a width (in cross-section) of 50 to 100 mils. Usually 40 to 60 milligrams of rubber will be used per linear circumferential inch of the rubber ring. A semi-circular shaped ring cross-section, as illustrated in FIGURE 1, is preferred.

The seal of this invention is amenable to being fabricated as continous sheets containing a multiplicity of seals, prior to punching and insertion in the caps. FIGURE 3 illustrates one process for fabricating the spot seals. A 1.5 mil polyethylene film (tensile, 2 pounds per inch width per mil; melt index, 2; density, 0.93 gram per cubic centimeters) 36 inches wide is coated at step 41 with a solution of 20 weight percent of polyvinylidene chloride copolymer (Dow Chemical's Saran Resin F–220) dissolved in acetone to give a continuous 0.05 mil thick film when dried. The polymer side of the laminate is next coated in step 42 with a latex type adhesive. The polymer laminate is then rolled on to a 110 kraft paper (tensile 50 p.s.i.) in step 43 and the laminate is dried in step 44. The paper side of the laminate is then preferably waterproofed in step 45 to make it stable in the subsequent rubber ring forming step, where the laminate contacts water-containing latex. A micro-crystalline wax impregnation is satisfactory. The wax also serves to prevent "edge wetting" failures of the final spot seals. A pick-up coating for the rings is then preferably applied, e.g., cyclized natural rubber in an amount of 0.5 gram per square foot. The laminate is then dried in step 46. The waterproofing agent can in some cases serve as the pick-up agent for the rubber rings.

A multitude of rubber rings in a continuous uniform pattern are then printed on the paper side of the laminate. This is done in step 47 using "printing" roll, having the desired mold design and arrangement engraved herein. A gelling latex is nipped into the molds and the paper surfaces are pressed against the molds which are heated until the latex gels and adheres to the paper. A typical latex that can be used is:

| | Wet weight |
|---|---|
| 55 percent butadiene, 45 percent styrene later, 60 percent solids (Naugatuck Chemical 2107 latex) grams | 100 |
| Dispersed sulfur, 73 percent in water | 2.4 |
| Butyl dithio dicarbamate | 0.9 |
| Zinc oxide | 6.14 |
| Water | 4.3 |
| Sodium pentachlorophenate | 0.005 |
| Ammonia | 3.1 |
| Benzoic acid | 1.7 |

This rubber has the following properties when cured at 190° F. for three hours:

Modulus at 600 percent elongation 500 p.s.i.
Modulus at 300 percent elongation 300 p.s.i.
Tensile=2000 p.s.i.
Recovery=50–55 percent.

By using this rotary printing method, as many as one half million rubber rings per hour per foot width can be placed on the paper surface when making seals for crown closures.

The laminate strip containing the uncured rubber rings is then dried and heated in step 48 to cure the rubber.

Thereafter, a thermosetting or thermoplastic adhesive such as polyvinyl chloride latex is sprayed on the cap side of the laminate in step 49.

The individual seals are punched from the continuous strips and simultaneously inserted into the caps in step 50. A machine such as a Nagy spotted cork machine slightly modified to accommodate the present seals instead of cork can be used. The caps fed into the machine are heated to facilitate adhesion of the seals via the thermoplastic adhesive. The design of the seal of this invention permits the use of existing cork insertion equipment which is particularly advantageous.

Approximately 10,000 crown closures as described, and comparative closures, were made in pilot plant equipment of the type described in connection with FIGURE 3 and using the materials described. Statistically significant samples of the crowns were used to cap commercial beer, soft drink and wine bottles containing soda water. Initial inspection of the seals of this invention by immersion of the bottles under the water disclosed no leakers. After two and a half months' storage at 212° F., 95 percent of the caps retained at least 90 percent of the original $CO_2$ content of the pack, and all retained at least 60 percent. The seals did not impart any taste to the packs. This performance is better than that obtained from present commercial available spotted cork seals or plain cork seals.

In alternative embodiments of this invention, a preformed polyvinylidene chloride film, or a coating from a solution or a latex, can be first bonded to the paper after which the polyolefin films can be extruded over the film. The film may first be primed with a titanate compound solution to insure good bonding.

While rotary printing of the rubber rings on continuous strips of the laminate has been described, flat bed printing of sheets of the laminate can also be used although it will be an intermittent operation.

Having described this invention, what is sought to be protected by Letters Patent is succinctly set forth in the following claims.

What is claimed is:

1. A seal comprising a plane, circular, tri-laminate and an adhering resilient rubber ring on the paper side and located substantially at the outer edge thereof, said tri-laminate comprising a waterproofed paper lamina, a co-extensive substantially gas-impervious polyvinylidene chloride plastic lamina bonded thereto and less than 0.9 mil thick, and a co-extensive polyolefin plastic lamina bonded to said polyvinylidene chloride plastic lamina and more than 1 mil thick.

2. In a metal crown closure, a complementary circular seal therein comprising a waterproofed paper lamina, a bonded thin gas-impermeable plastic film, a tough polyolefin plastic film bonded thereto, and an adhering resilient rubber ring on the paper side, said ring being placed against the cap.

3. The seal of claim 2 wherein said gas-impermeable plastic film is a polyvinylidene chloride less than 0.1 mil thick and said polyolefin plastic film consists of a polymer selected from the group consisting of polyethylene and polypropylene and is more than 1 mil thick.

4. A seal comprising a waterproofed paper lamina, a bonded thin gas-impermeable plastic film, a tough polyolefin plastic film bonded thereto, and an adhering resilient rubber ring on the paper side.

References Cited in the file of this patent

UNITED STATES PATENTS

| | | |
|---|---|---|
| 1,907,994 | McManus | May 9, 1933 |
| 2,516,647 | Rogers et al. | July 25, 1950 |
| 2,601,318 | Navikas | June 24, 1952 |
| 2,626,073 | Miller et al. | Jan. 20, 1953 |
| 2,777,411 | Geisler | Jan. 15, 1956 |
| 2,834,498 | Olt et al. | May 13, 1958 |
| 2,901,139 | Isele-Aregger | Aug. 25, 1959 |
| 2,975,074 | Jankens et al. | Mar. 14, 1961 |

FOREIGN PATENTS

| | | |
|---|---|---|
| 550,700 | Great Britain | Jan. 20, 1943 |